(12) United States Patent
New et al.

(10) Patent No.: US 8,678,658 B2
(45) Date of Patent: Mar. 25, 2014

(54) TILTING PAD BEARING

(75) Inventors: Nigel H. New, Harrow (GB); Guy Pethybridge, High Wycombe (GB)

(73) Assignee: Waukesha Bearings Corporation, Pewaukee, WI (US)

( * ) Notice: Subject to any disclaimer, the term of this patent is extended or adjusted under 35 U.S.C. 154(b) by 179 days.

(21) Appl. No.: 13/245,549

(22) Filed: Sep. 26, 2011

(65) Prior Publication Data
US 2012/0020598 A1   Jan. 26, 2012

Related U.S. Application Data

(63) Continuation-in-part of application No. 12/962,430, filed on Dec. 7, 2010, now abandoned, which is a continuation of application No. 11/787,146, filed on Apr. 13, 2007, now Pat. No. 7,845,855, application No. 13/245,549, which is a continuation-in-part of application No. 11/998,279, filed on Nov. 29, 2007, now abandoned, and a continuation-in-part of application No. 12/793,983, filed on Jun. 4, 2010, now Pat. No. 8,408,802, which is a continuation-in-part of application No. 13/005,997, filed on Jan. 13, 2011.

(60) Provisional application No. 61/217,989, filed on Jun. 8, 2009, provisional application No. 61/386,054, filed on Sep. 24, 2010.

(51) Int. Cl.
*F16C 17/06* (2006.01)

(52) U.S. Cl.
USPC .......................................... 384/308; 384/122

(58) Field of Classification Search
USPC .......................................... 384/122, 306–312
See application file for complete search history.

(56) References Cited

U.S. PATENT DOCUMENTS 1,541,411 A    6/1925  Davis
2,197,432 A *  4/1940  Kingsbury .................... 384/308
(Continued)

FOREIGN PATENT DOCUMENTS

JP    61184805 A    8/1986
JP     6023672 A    2/1994
(Continued)

OTHER PUBLICATIONS

PCT/US2011/053303, Notification of Transmittal of the International Search Report & Written Opinion of the International Searching Authority, Apr. 10, 2012.

*Primary Examiner* — Thomas R Hannon
(74) *Attorney, Agent, or Firm* — Hamilton IP Law, PC; Jay R. Hamilton; Charles A. Damschen

(57) ABSTRACT

A tilting pad bearing comprises a piston carrier ring that may include a plurality of voids spaced around the piston carrier ring, wherein a channel may be formed in a surface of the piston carrier ring opposite the plurality of voids. A carrier end plate may be positioned in the channel and secured to the piston carrier ring, wherein a recess may be formed in a top surface of the carrier end plate. A piston may be positioned in each void, wherein a bottom face of each piston is positioned adjacent the recess. The pistons may be substantially secured in the voids using a plurality of membranes, wherein one membrane corresponds to one piston and one void. Alternatively, the pistons may be formed in two pieces secured via a membrane. Each piston may be engaged with a bearing pad and/or interface member in a bearing pad carrier ring.

14 Claims, 13 Drawing Sheets

(56) References Cited

U.S. PATENT DOCUMENTS

| | | | |
|---|---|---|---|
| 2,986,431 A * | 5/1961 | Block et al. | 384/308 |
| 3,160,450 A * | 12/1964 | Gentilnomo | 384/308 |
| 3,837,178 A | 9/1974 | Hackforth et al. | |
| 3,859,868 A | 1/1975 | Post | |
| 3,909,587 A | 9/1975 | Mattis | |
| 4,099,802 A * | 7/1978 | Heinemann et al. | 384/122 |
| 4,103,979 A | 8/1978 | Kuhn | |
| 4,239,300 A * | 12/1980 | Adler | 384/120 |
| 4,288,128 A | 9/1981 | Wells | |
| 4,335,925 A | 6/1982 | Stopp | |
| 4,456,391 A | 6/1984 | New | |
| 4,473,310 A | 9/1984 | Advani et al. | |
| 4,515,486 A | 5/1985 | Ide | |
| 4,738,550 A | 4/1988 | Gardner | |
| 5,007,745 A | 4/1991 | Ball et al. | |
| 5,012,694 A | 5/1991 | McGrath | |
| 5,068,965 A | 12/1991 | Ball et al. | |
| 5,124,605 A | 6/1992 | Bitterly et al. | |
| 5,137,373 A | 8/1992 | Ide | |
| 5,156,379 A | 10/1992 | Tabata | |
| 5,205,653 A * | 4/1993 | Veronesi et al. | 384/306 |
| 5,353,640 A | 10/1994 | Jiang et al. | |
| 5,372,431 A | 12/1994 | Ide | |
| 5,415,061 A | 5/1995 | Kohno | |
| 5,498,082 A | 3/1996 | Nadjafl | |
| 5,549,392 A | 8/1996 | Anderson | |
| 5,556,208 A | 9/1996 | Ide | |
| 5,567,057 A | 10/1996 | Boller | |
| 5,743,654 A | 4/1998 | Ide et al. | |
| 5,772,335 A | 6/1998 | Miller | |
| 5,795,076 A | 8/1998 | Ball et al. | |
| 5,816,114 A | 10/1998 | Gregoire et al. | |
| 5,879,085 A | 3/1999 | Ball et al. | |
| 5,954,480 A | 9/1999 | Schmaling et al. | |
| 6,079,102 A | 6/2000 | Miller | |
| 6,170,989 B1 | 1/2001 | Zeidan | |
| 6,183,138 B1 | 2/2001 | New | |
| 6,200,034 B1 | 3/2001 | Miller | |
| 6,379,046 B1 | 4/2002 | Zeidan | |
| 6,443,621 B1 | 9/2002 | New | |
| 6,499,883 B2 | 12/2002 | Miller | |
| 6,739,756 B2 | 5/2004 | Miller | |
| 6,746,152 B2 | 6/2004 | Branagan | |
| 7,163,368 B2 | 1/2007 | Ide et al. | |
| 7,275,872 B2 | 10/2007 | Abrahamian | |
| 7,311,445 B2 | 12/2007 | New | |
| 7,367,713 B2 | 5/2008 | Swann et al. | |
| 7,611,286 B2 | 11/2009 | Swann et al. | |
| 7,845,855 B2 | 12/2010 | Bischof et al. | |
| 2003/0153419 A1 | 8/2003 | Hodjat et al. | |
| 2006/0078239 A1 | 4/2006 | Dimofte | |
| 2008/0131039 A1 | 6/2008 | New | |
| 2008/0131042 A1 | 6/2008 | New | |
| 2008/0253706 A1 | 10/2008 | Bischof et al. | |
| 2009/0268995 A1 | 10/2009 | Ide et al. | |
| 2010/0310201 A1 | 12/2010 | Zeidan | |
| 2011/0188789 A1 | 8/2011 | Bischof et al. | |

FOREIGN PATENT DOCUMENTS

| | | |
|---|---|---|
| JP | 6323505 A | 11/1994 |
| JP | 2010151283 A | 7/2010 |
| RU | 2038516 C1 | 6/1995 |

* cited by examiner

TILTING PAD BEARING

CROSS REFERENCE TO RELATED APPLICATIONS

This patent application claims priority from and is a continuation-in-part of U.S. patent application Ser. No. 12/962,430 filed on Dec. 7, 2010, now abandoned which claimed priority from and was a continuation of U.S. patent application Ser. No. 11/787,146, filed on Apr. 13, 2007, now U.S. Pat. No. 7,845,855; this patent application also claims priority from and is a continuation-in-part of U.S. patent application Ser. No. 11/998,279 filed on Nov. 29, 2007; now abandoned this patent application also claims priority from and is a continuation-in-part of U.S. patent application Ser. No. 12/793,983 filed on Jun. 4, 2010, now U.S. Pat. No. 8,408,802 which claimed priority from provisional U.S. Pat. App. No. 61/217,989 filed on Jun. 8, 2009; this patent application also claims priority from and is a continuation-in-part of U.S. patent application Ser. No. 13/005,997 filed on Jan. 13, 2011, all of which are incorporated by reference herein in their entireties. Applicant also claims priority from provisional U.S. Pat. App. No. 61/386,054 filed on Sep. 24, 2010 which is incorporated herein in its entirety.

FIELD OF INVENTION

The present invention relates to hydrodynamic thrust bearings, and more specifically, titling pad thrust bearings.

STATEMENT REGARDING FEDERALLY SPONSORED RESEARCH OR DEVELOPMENT

No federal funds were used to develop or create the invention disclosed and described in the patent application.

REFERENCE TO SEQUENCE LISTING, A TABLE, OR A COMPUTER PROGRAM LISTING COMPACT DISK APPENDIX

Not Applicable

BACKGROUND

Tilting pad thrust bearings typically transmit a thrust force from a rotating shaft to a ring of bearing pads via a hydrodynamically generated film between the individual bearing pads and the cooperating collar (or runner), which rotates with the shaft. The thickness of this film depends on many factors, and may be less than five microns in certain applications.

It is important that all individual bearing pads lie in the plane of the collar due to the small film thickness between the bearing pads and the collar. Generally, this requires that the parts of the tilting pad bearing are machined to very high tolerances, and that the machine build results in an accurate alignment between the plane of the collar and the bearing support (to which a tilting pad bearing is affixed). Accurate alignment of the relevant elements becomes more difficult as the size of the machine increases.

Several tilting pad bearings of the prior art have disclosed mechanisms between the bearing pads and the bearing support designed to compensate for the above-mentioned difficulties. A partial solution for small tilting pad thrust bearings was disclosed in GB 1,140,773, which taught filling a sealed chamber between two axially spaced annular plates with a fluid. Accordingly, each plate could move angularly with respect to the other but resist any change in the mean axial position with respect to one another due to the fluid interface. Manufacturing considerations limit the use of this type of tilting pad bearing to machines requiring a bearing with an outside diameter of up to approximately 200 millimeters.

A similar device was taught by in GB 1,458,660 that used individual capsules, each constructed in a manner similar to that of the joined annular plates described above, wherein each capsule carried one bearing pad. The capsules were set in a ring housing and fluidly connected via a series of hydraulic pipes. However, the associated connections and piping increased the likelihood of a hydraulic leak exponentially compared to other systems.

BRIEF DESCRIPTION OF THE FIGURES

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limited of its scope, the invention will be described and explained with additional specificity and detail through the use of the accompanying drawings.

DETAILED DESCRIPTION

Listing of Elements

Figure 1:
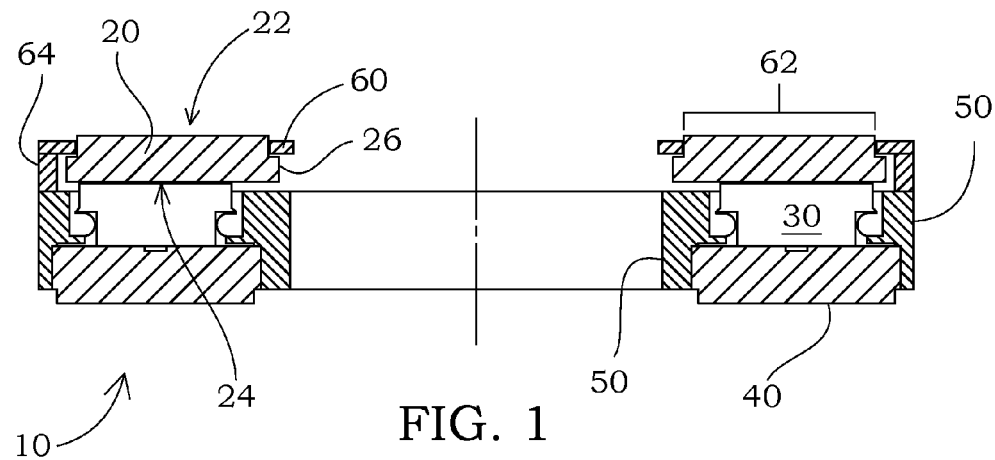
FIG. 1 provides a diametrical cross-sectional view across two voids and pistons of a first embodiment of the tilting pad bearing.

| ELEMENT DESCRIPTION | ELEMENT # |
|---|---|
| Shaft | 4 |
| Shaft collar | 6 |
| Tilting pad bearing | 10 |
| Membrane | 12 |
| Interstitial space | 14 |
| Bearing support | 16 |
| Spacer | 18 |
| Bearing pad | 20 |
| External bearing surface | 22 |
| Internal bearing surface | 24 |
| Pad shoulder | 26 |
| Positioner groove | 28 |
| Piston | 30 |
| Top face | 32 |
| Bottom face | 34 |
| Relief | 36 |
| Piston shoulder | 38 |
| Two-piece piston | 30' |
| Top piece | 32' |
| Radiused surface | 32a' |
| Divot | 32b' |
| Top shoulder | 33' |
| Bottom piece | 34' |
| Bottom shoulder | 35' |
| Bore | 36' |
| Bottom spigot | 38' |
| Groove | 39' |
| Carrier end plate | 40 |
| Top surface | 42 |
| Recess | 42a |
| Bottom surface | 44 |
| Piston carrier ring | 50 |
| Center aperture | 51 |
| Void | 52 |
| Hole | 53 |
| Lip | 54 |
| Lip shelf | 54a |
| Piston carrier ring/end plate interface | 56 |
| Fill aperture | 57 |
| Plug | 57a |
| Channel | 58 |
| Retaining plate | 60 |
| Retaining plate aperture | 62 |
| Support pillar | 64 |
| Positioner | 70 |
| Positioner shaft | 72 |
| Positioner head | 74 |
| Bearing pad carrier ring | 80 |
| Main aperture | 81 |

-continued

| ELEMENT DESCRIPTION | ELEMENT # |
|---|---|
| Positioner void | 82 |
| First trough | 83a |
| Second trough | 83b |
| Interface member void | 84 |
| Top ridge | 85a |
| Bottom ridge | 85b |
| Bearing pad carrier ring/piston carrier ring interface | 86 |
| Piston void | 87 |
| Interface member | 90 |
| Top piece | 92 |
| Top surface | 92a |
| Nipple | 92b |
| Bottom piece | 94 |
| Recess | 94a |
| Tab | 94b |

DETAILED DESCRIPTION

Before the various embodiments of the present invention are explained in detail, it is to be understood that the invention is not limited in its application to the details of construction and the arrangements of components set forth in the following description or illustrated in the drawings. The invention is capable of other embodiments and of being practiced or of being carried out in various ways. Also, it is to be understood that phraseology and terminology used herein with reference to device or element orientation (such as, for example, terms like "front", "back", "up", "down", "top", "bottom", and the like) are only used to simplify description of the present invention, and do not alone indicate or imply that the device or element referred to must have a particular orientation. In addition, terms such as "first", "second", and "third" are used herein and in the appended claims for purposes of description and are not intended to indicate or imply relative importance or significance.

Figure 1A:
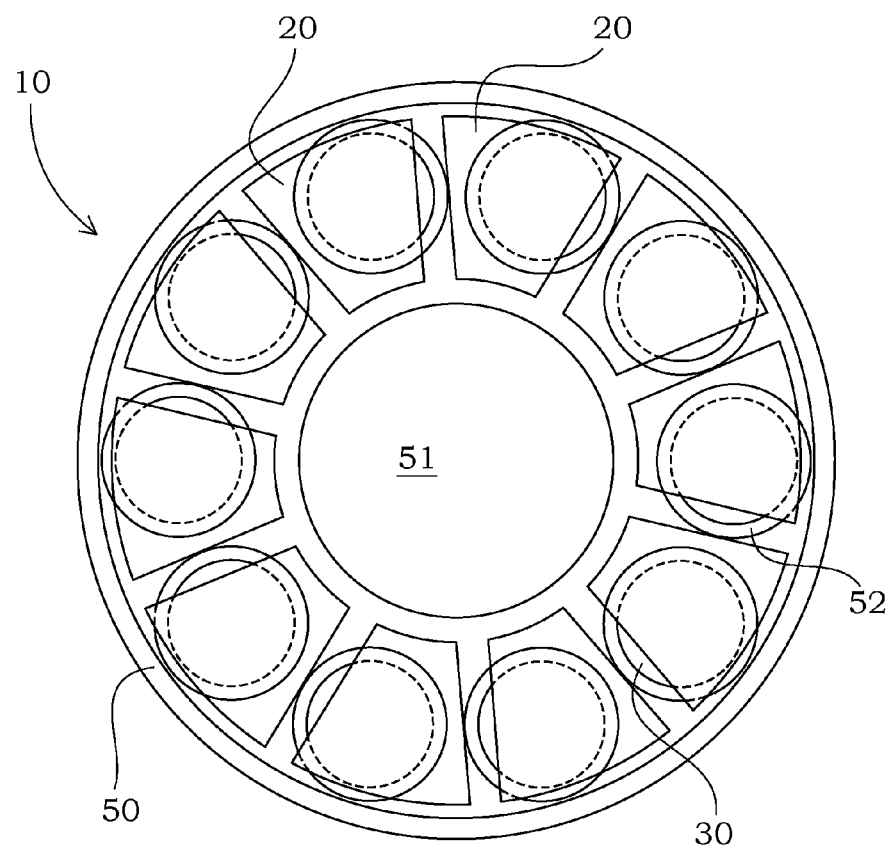
FIG. 1A provides an axial view of the first embodiment of the tilting pad bearing with the retaining plate removed for clarity.

Referring now to the drawings, wherein like reference numerals designate identical or corresponding parts throughout the several views, FIG. 1 provides a diametric cross-sectional view of a first embodiment of the tilting pad bearing 10, and FIG. 1A provides an axial view of the first embodiment of the tilting pad bearing 10. The bearing pads 20 in the illustrative embodiment are generally trapezoidal in shape, with the base and top edges being arcuate rather than linear. However, the bearing pads 20 may have any shape and/or configuration, and the scope of the tilting pad bearing 10 as disclosed and claimed herein is in no way limited thereby.

Figure 6A:
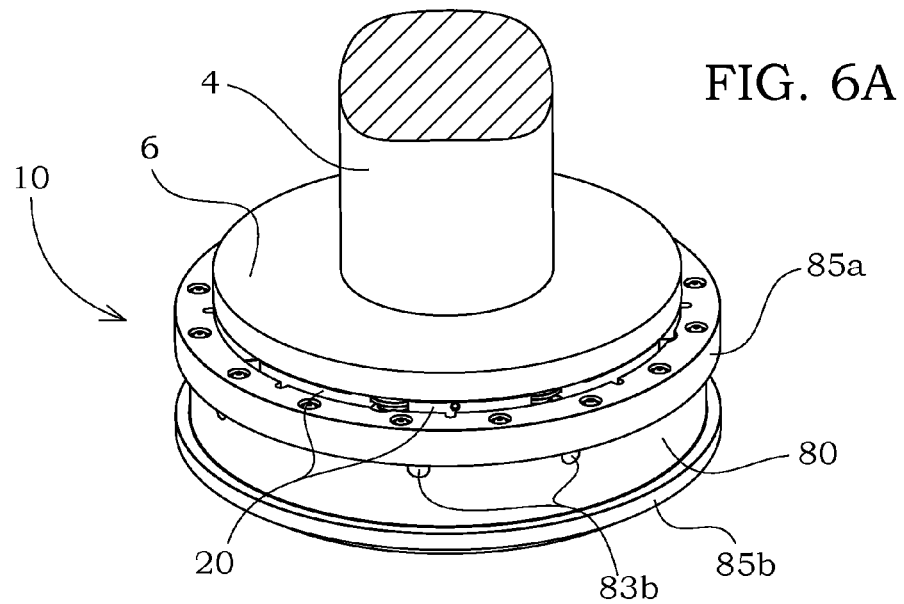
FIG. 6A provides a perspective view of a third embodiment of a tilting pad bearing engaged with a shaft collar.
Figure 6B:
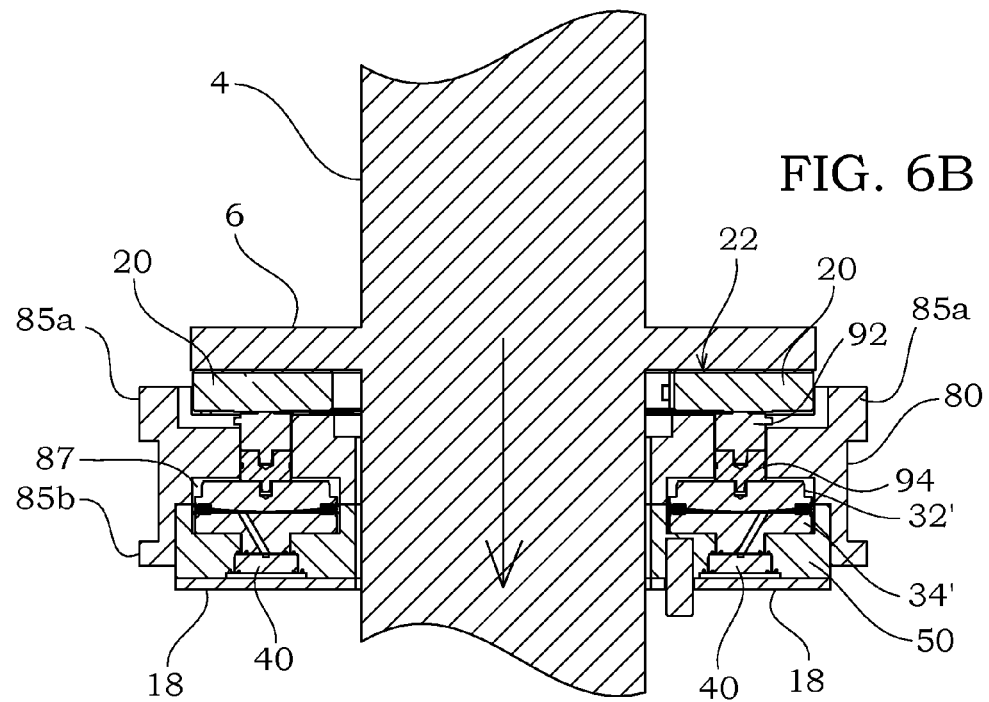
FIG. 6B provides an axial cross-sectional view of the third embodiment of a tilting pad bearing engaged with a shaft collar.
Figure 7A:
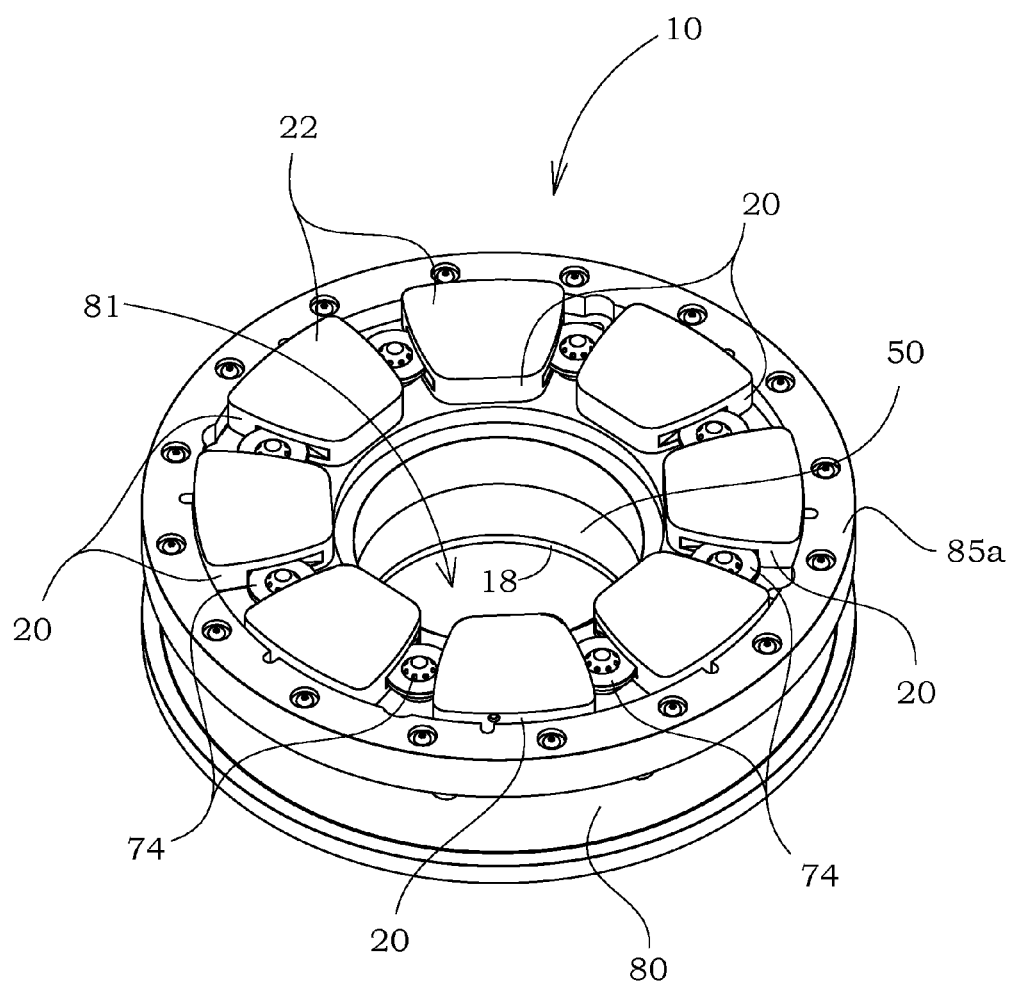
FIG. 7A provides a perspective view of the third embodiment of the tilting pad bearing.
Figure 7B:
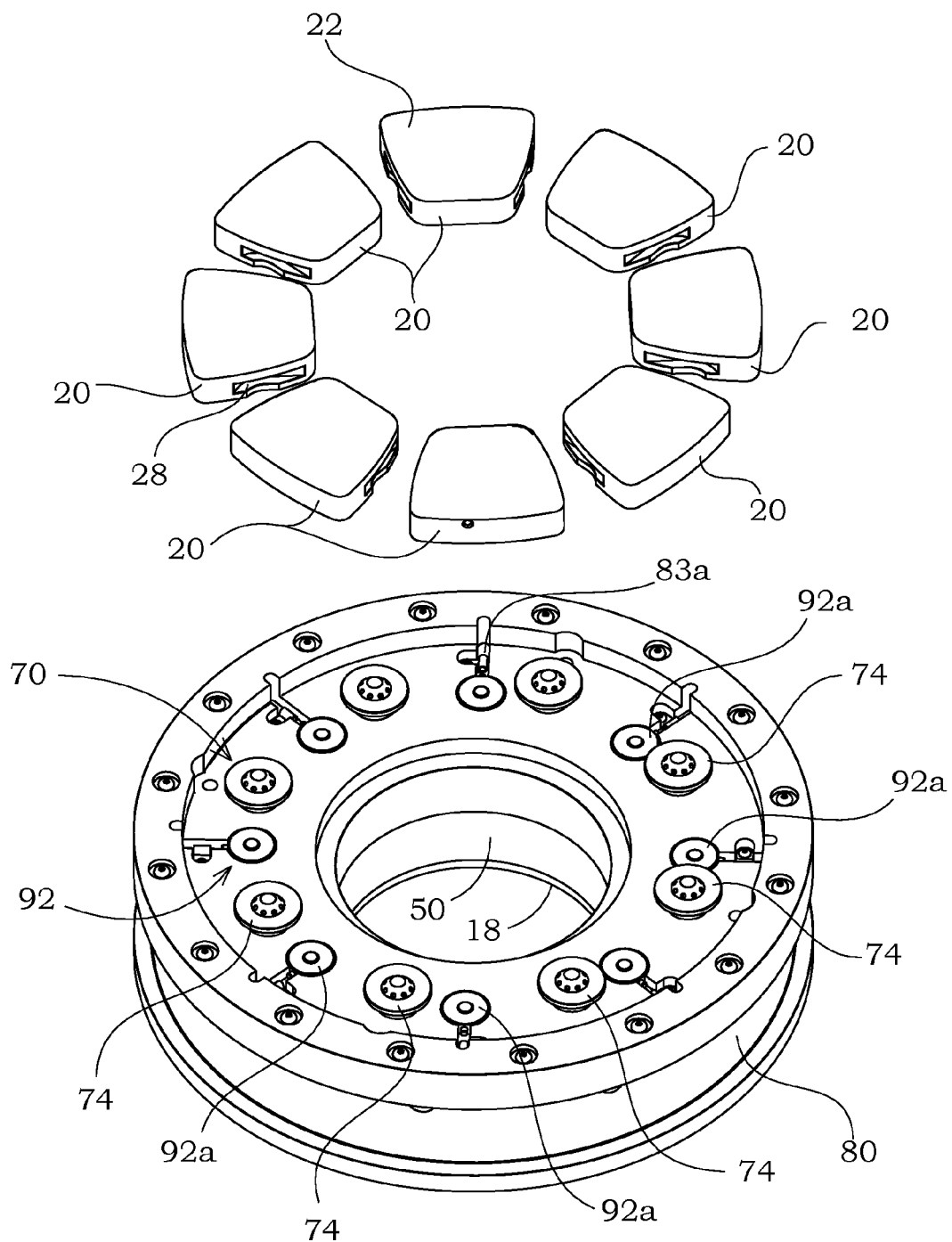
FIG. 7B provides a perspective view of the third embodiment of the tilting pad bearing with the bearing pads removed for clarity.
Figure 8:
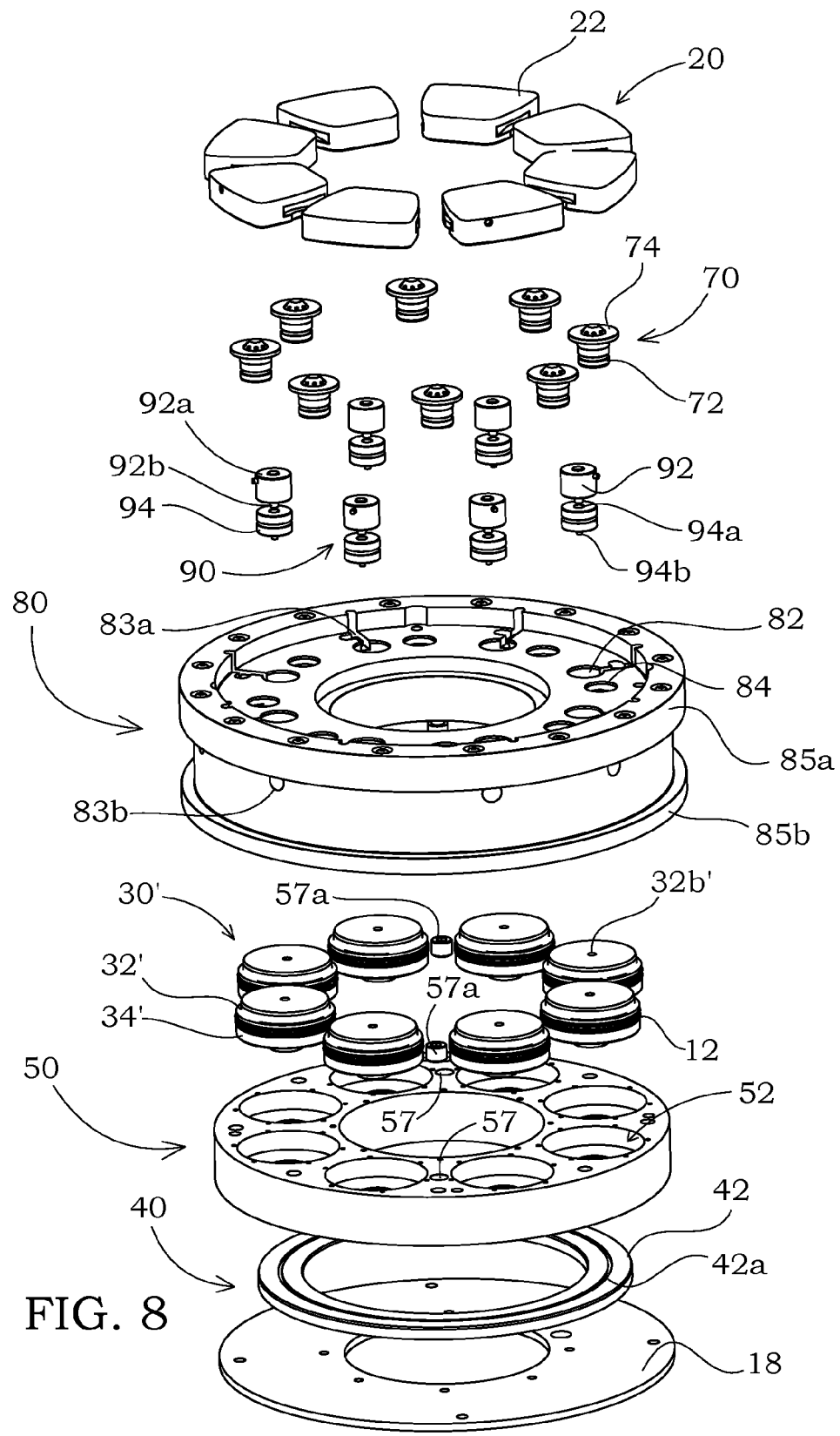
FIG. 8 provides a perspective exploded view of the third embodiment of the tilting pad bearing.

Each bearing pad 20 may include an external bearing surface 22, which is typically configured for cooperation with a shaft collar (best shown in FIGS. 6A & 6B) attached to a rotatable shaft 4. Each bearing pad 20 may also include an internal bearing surface 24, which may be configured to cooperate and/or interface with the top face 32 of a piston 30, as described in detail below for the first embodiment (or the internal bearing surface 24 may cooperate and/or interface with an interface member 90, as described in detail for a third embodiment of the tilting pad bearing 10). Each bearing pad 20 may also include a pad shoulder 26, as best shown in FIG. 1. This allows for retention of the bearing pad 20 in the correct position above the piston 30 by a retaining plate 60, which is shown in FIG. 1 and described in detail below, but removed in FIG. 1A for purposes of clarity. In other embodiments of the tilting pad bearing 10 shown and described herein, the bearing pads 20 do not utilize a pad shoulder 26, and those embodiments may function without a retaining plate 60.

Accordingly, such variances in no way limits the scope of the tilting pad bearing 10 as disclosed and claimed herein.

Figure 5:
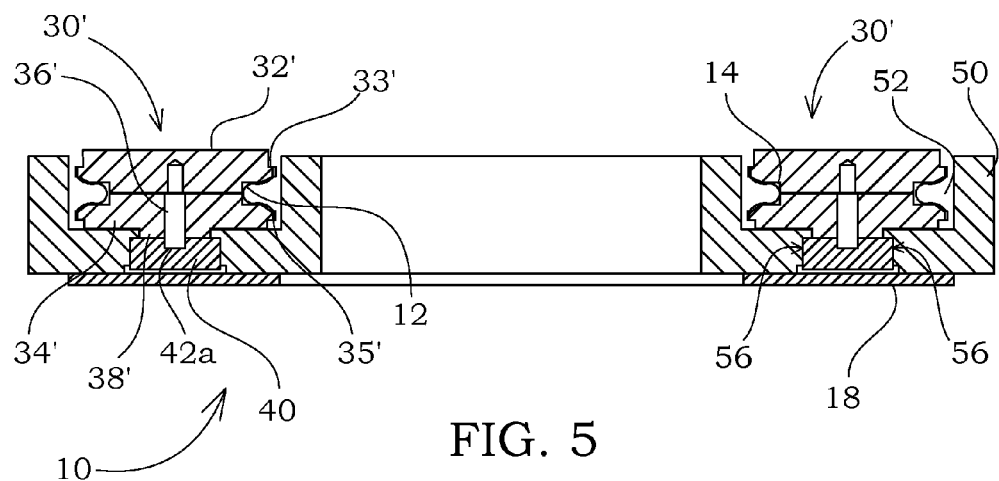
FIG. 5 provides a diametrical cross-sectional view across two voids and two-piece pistons of a second embodiment of the tilting pad bearing.

The tilting pad bearing 10 may also include a piston carrier ring 50 having a center aperture 51 in the middle thereof, through which a portion of the shaft 4 may pass. The piston carrier ring 50 is typically securely engaged with a bearing support 16 (best shown in FIG. 3) about the outer periphery of the piston carrier ring 50. In other applications, a spacer 18 may be positioned adjacent the tilting pad bearing 10 on at least one axial surface thereof, as best shown in FIG. 5. The piston carrier ring 50 may be formed with a plurality of voids 52 circumferentially positioned thereabout in an axial face thereof. The voids 52 in the illustrative embodiment of the tilting pad bearing 10 are generally cylindrical in shape with the longitudinal axis of each void 52 being parallel to the longitudinal axis of the center aperture 51. However, the voids 52 may have any shape particularly useful for the specific application without limitation.

Figure 3:
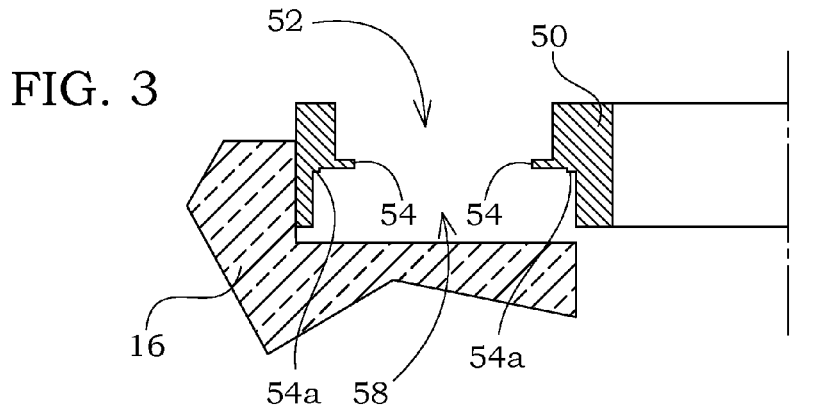
FIG. 3 is a detailed, axial cross-sectional view of one embodiment of a carrier ring that may be used with certain embodiments of the tilting pad bearing with the piston and carrier end plate removed for clarity.

An annular lip 54 may extend into each void 52 from the piston carrier ring 50, as best shown in FIG. 3. The piston carrier ring 50 may also be formed with an annular channel 58 therein on the axial face of the piston carrier ring 50 opposite the plurality of voids 52. The voids 52 as shown and described herein are simply one structure for receiving the piston 30, but any structure and/or method may be used herewith without departing from the spirit and scope of the tilting pad bearing 10 as disclosed and claimed herein.

The embodiment of the retaining plate 60 shown in FIG. 1 includes a plurality of retaining plate apertures 62, wherein each retaining plate aperture 62 corresponds to one bearing pad 20. As clearly shown in FIG. 1, the retaining plate aperture 62 may have a periphery slightly less than that of the pad shoulder 26 so that the external bearing surface 22 may protrude through the retaining plate aperture 62, but so that the pad shoulder 26 in cooperation with the retaining plate 60 secures the bearing pad 20 in the proper location. The retaining plate 60 may be supported in the axial direction by a plurality of support pillars 64, as shown in FIG. 1. The number of support pillars 64 required will vary from one embodiment of the tilting pad bearing 10 to the next, and is therefore in no way limiting.

For example, in the pictured embodiment, the support pillars 64 may be configured in a tubular manner such that screws or other fasteners (not shown) may pass through corresponding apertures (not shown) in the retaining plate 60 and cooperatively engage threaded apertures (not shown) in the piston carrier ring 50. Alternatively, the support pillars 64 may be affixed to the piston carrier ring 50 and be configured with threaded interior portions to accept screws or other fasteners passing through apertures formed in the retaining plate 60. In still another embodiment (such as that shown in FIGS. 6-12), the piston carrier ring 50 or bearing pad carrier ring 80 may be fashioned with an axially extending top ridge 85a such that support pillars 64 are not required. This top ridge 85a and/or support pillars 64 may be positioned on the inner diameter of the retaining plate 60, piston carrier ring 50, and/or bearing pad carrier ring instead of or in addition to the outer diameter thereof. The retaining plate 60 may be secured to the piston carrier ring 50 and/or bearing pad carrier ring 80 using any suitable method and/or structure, including but not limited to mechanical fasteners, welding, chemical adhesion, frictional forces, and/or combinations thereof. Accordingly, the specific structure and/or method used to properly locate the bearing pads 20 with respect to the piston carrier ring 50 and/or bearing pad carrier ring 80 in no way limits the scope of the tilting pad bearing 10 as disclosed and claimed herein.

Figure 2:
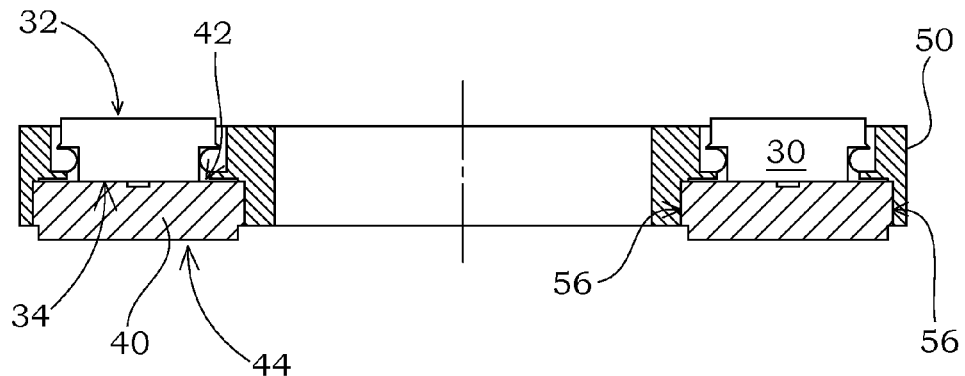
FIG. 2 provides a diametrical cross-sectional view of the first embodiment of the tilting pad bearing with the pads removed for clarity.
Figure 2A:
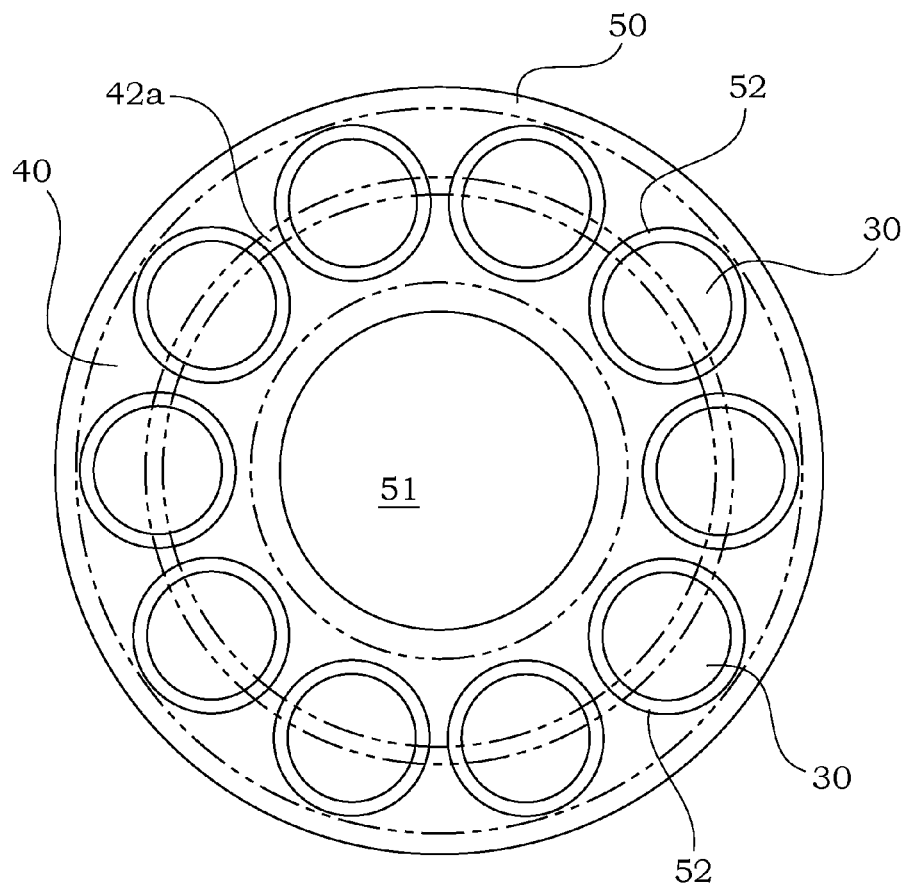
FIG. 2A provides an axial view of the first embodiment of the tilting pad bearing.

The first embodiment of the tilting pad bearing 10 includes a plurality of pistons 30, wherein each piston 30 corresponds to one void 52 and one bearing pad 20. As shown in FIGS. 1A and 2A the pistons 30 and voids 52 may be offset from the bearing pads 20 such that a piston 30 primarily contacts a corresponding bearing pad 20 at a position other than the geometric center of the bearing pad 20. The pistons 30 in the illustrative embodiment are generally cylindrical in shape, although other embodiments of the tilting pad bearing 10 may have pistons 30 of other shapes without limitation.

Figure 4:
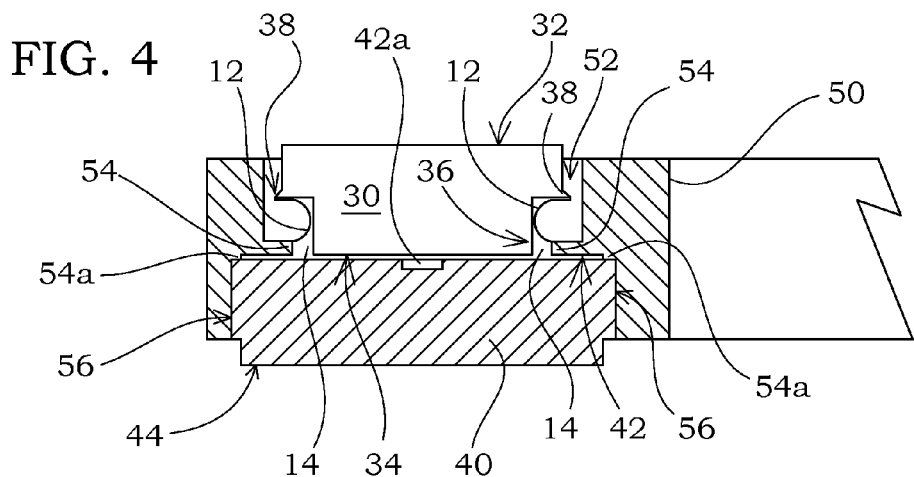
FIG. 4 is a detailed, axial cross-sectional view of one embodiment of a piston, carrier ring, carrier end plate, and associated elements that may be used with certain embodiments of the tilting pad bearing.

The piston 30 includes a top face 32 that is positioned adjacent the bearing pad 20 and a bottom face 34 that is positioned adjacent a carrier end plate 40. The cross-sectional diameter of the top face 32 in the illustrative embodiment is greater than that of the bottom face 34 due to a relief 36 adjacent the bottom face 34. The relief 36 serves to define a piston shoulder 38 intermediate the top face 32 and bottom face 34. The cross-sectional diameter of both the top face 32 and bottom face 34 may both be less than that of the void 52, as depicted in FIG. 4, such that the piston 30 fits within the void 52. However, the interior diameter of the lip 54 may be less than the cross-sectional diameter of the piston 30 at the piston shoulder 38, which is also shown in FIG. 4. Additionally, it is contemplated that the length of the piston 30 may be slightly greater than the depth of the void 52, such that a portion of the piston 30 protrudes from the void 52 as best shown in FIG. 4.

Again referring to FIG. 4, a membrane 12 may be secured to the piston shoulder 38 and the lip 54. It is contemplated that in most applications the membrane 12 will be flexible and impervious to certain fluids. In the illustrative embodiment, the membrane 12 may have a predetermined amount of both rotational and axial flexibility. Typically, the internal bearing surface 24 will be positioned adjacent the top face 32 of the piston 30. Because of the rotational and axial flexibility of the membrane 12, the piston 30 may tilt by a certain amount due to forces exerted upon the corresponding bearing pad 20. This allows the bearing pad 20 to be mounted directly to the piston 30. That is, rather than allowing just the bearing pad 20 to tilt with respect to the structure that supports the bearing pad 20 (e.g., a piston 30 in the illustrative embodiment), the tilting pad bearing 10 as disclosed herein allows both the bearing pad 20 and piston 30 to tilt. This eliminates the need for a pivot point between the bearing pad 20 and the structure supporting the bearing pad 20.

The bearing pad 20 may be secured to the piston 30 using any suitable method and/or structure, including but not limited to welding, mechanical fasteners such as rivets, screws, or bolts, chemical adhesives, and/or combinations thereof. However, in general, the bearing pad 20 will not be affixed to the piston 30, but located in contact with the piston 30 by a locating member, such as the retaining plate 60. Other structures and/or methods to retain each bearing pad 20 in proper position with respect to each piston 30 may be used with the tilting pad bearing 10 without limitation as previously described.

Although the first embodiment of the tilting pad bearing 10 employs a plurality of voids 52 to retain the pistons 30, the tilting pad bearing 10 is not so limited. In other embodiments not pictured herein, raised seats (not shown) are circumferentially spaced about the piston carrier ring 50 and/or bearing pad carrier ring 80, and each raised seat corresponds to one piston 30. The membrane 12 may then connect to the top edge of the raised seat and the piston 30. Accordingly, any suitable structure and/or method may be used to secure each piston 30 to the piston carrier ring 50 and/or bearing pad carrier ring within the spirit and scope of the tilting pad bearing 10 as long as that structure and/or method allows for a plurality of pistons 30 fluidly connected to one another, as described in detail below.

Furthermore, in other embodiments of the titling pad bearing 10 the pistons 30 are shaped and configured differently than those shown herein. For example, the pistons 30 may have a square cross-sectional shape, wherein the cross-sectional area increases or decreases along the length of the piston 30. Accordingly, any suitable structure and/or method may be used to support a bearing pad(s) 20 within the spirit and scope of the titling pad bearing 10 as long as that structure and/or method transmits tilting forces from a bearing pad 20 to a support structure (e.g., piston, interface member 90), and the support structure in turn tilts with respect to the piston carrier ring 50 and/or bearing pad carrier ring 80.

A carrier end plate 40 may be positioned in the annular channel 58 of the piston carrier ring 50 and secured therein via any suitable method and/or structure, including but not limited to mechanical fasteners, chemical adhesion, welding, and/or combinations thereof. The channel 58 may be formed with a lip shelf 54a to locate the carrier end plate 40 a predetermined distance from the bottom surface of the lip 54, which is best shown in FIG. 3, wherein the carrier end plate 40 has been removed from the piston carrier ring 50. The carrier end plate 40 may include a bottom surface 44 opposite the piston 30 and a top surface 42 adjacent the piston 30. An annular recess 42a may be formed in the top surface 42 near the geometric center of the piston 30. The bottom face 34 of the piston 30, relief 36, piston shoulder 38, lip 54, and top surface 42 of the carrier end plate 40 cooperate to form and interstitial space 14, which is best shown in FIG. 4. The interstitial space 14 may be sealed from the external environment via a membrane 12 as described in greater detail below. The recess 42a in the carrier end plate 40 top surface 42 fluidly connects the interstitial space 14 associated with one void 52 to the interstitial space 14 associated with the adjacent void 52.

The membrane 12 may secured to the piston shoulder 38 and lip 54 such that each interstitial space 14 may be filled with a suitable fluid in a manner described in detail below, and such that the fluid will not leak into the area of the void 54 above the membrane 12. Any fluid suitable for the particular application of the tilting pad bearing 10 may be used without limitation, including but not limited to water and aqueous mixtures and solutions, glycerol, synthetic oils, natural oils both mineral and vegetable and/or combinations thereof.

The carrier end plate 40 may be secured in the piston carrier ring 50 channel 58 such that the piston carrier ring/end plate interface 56 forms a hermetic seal between the top surface 42 and bottom surface 44 of the carrier end plate 40. Accordingly, the fluid-filled interstitial spaces 14 may comprise a closed system hermetically sealed from the exterior environment. The membrane 12 may be secured to the piston shoulder 38 and/or lip 54 using any suitable method and/or structure, including but not limited to welding, mechanical fasteners such as rivets, screws, or bolts, chemical adhesives, and/or combinations thereof. The carrier end plate 40 may be secured to the piston carrier ring 50 using any suitable method and/or structure, including but not limited to welding, mechanical fasteners such as rivets, screws, or bolts, chemical adhesives, an interference fit, and/or combinations thereof.

Because each interstitial space 14 is ultimately in fluid communication with all other interstitial spaces 14 via the recess 42a in the carrier end plate 40, forces imparted to one piston 30 are transferred to the fluid in the interstitial spaces 14, thereby pressurizing the fluid therein and equalizing the axial force across all pistons 30 in a given tilting pad bearing 10. That is, because all pistons 30 are in fluid communication with one another, this hydraulic pressure equally acts on each piston 30, which eliminates misalignments and/or tolerance differences that would typically result in the pistons 30 carrying different loads. Accordingly, the various interstitial spaces 14, membranes 12, pistons 30, carrier end plate 40, and piston carrier ring 50 form an annular fluid chamber that may be hermetically sealed, thereby resulting in axial forces being distributed evenly about the tilting pad bearing 10. Furthermore, the various bearing pads 20 may equalize their respective loads by tilting, which may produce a hydrodynamic film within the respective interstitial space 14.

A second embodiment of the tilting pad bearing 10 is shown in FIG. 5, wherein the tilting pad bearing 10 operates under the same principles as those embodiments previously described, but in which certain elements thereof are differently configured. The embodiment of the tilting pad bearing 10 in FIG. 5 uses a two-piece piston 30', which is generally comprised of a top piece 32' and a bottom piece 34'. The two-piece piston 30' may also be received in a void 52 formed in the piston carrier ring 50 as previously described. The top piece 32' may include a top shoulder 33' and the bottom piece 34' may include a bottom shoulder 35'. The top and bottom pieces 32', 34' may be flexibly secured to one another via a membrane 12 in a similar manner previously described for flexibly securing a piston 30 to a void 52 in the piston carrier ring 50. The respective ends of the membrane 12 may be affixed to the top and bottom shoulders 33', 35' respectively by any structure and/or method, including but not limited to welding, chemical adhesion, and/or combinations thereof.

The bottom piece 34' may also be formed with a bottom spigot 38', which protrudes from the bottom face 34. The bottom spigot 38' may be configured to fit within a hole 53 formed in the piston carrier ring 50, wherein the hole 53 may be adjacent the channel 58 (and consequently, the carrier end plate 40 when the tilting pad bearing 10 is fully assembled), as shown in FIG. 5. The hole 53 and the bottom spigot 38' may have any complimentary cross-sectional shapes without limitation.

It is contemplated that the bottom piece 34' may be hermetically sealed to the piston carrier ring 50 about the bottom spigot 38'. For example, a weld may be positioned around the periphery of the bottom spigot 38' to secure and hermetically seal the bottom piece 34' to the piston carrier ring 50. The bottom piece may be secured to the piston carrier ring 50 using any structure and/or method without limitation, including but not limited to welding, chemical adhesives, mechanical fasteners, and/or combinations thereof regardless of whether the bottom piece 34' is formed with a bottom spigot 38'. The bottom piece 34' may also be formed with a bore 36' through the interior thereof. The bore 36' may have any cross-sectional shape without limitation, and may extend to the interface between the top piece 32' and bottom piece 34' as shown in FIG. 5. It is contemplated that the longitudinal axis of the bore 36' may be generally parallel to the longitudinal axis of the center aperture 51 of the piston carrier ring 50.

From the description and figures herein, it will be apparent to those skilled in the art that the embodiment of the tilting pad bearing 10 shown in FIG. 5 includes an interstitial space 14. This interstitial space 14 is formed among the membrane 12, top and bottom shoulders 33', 35, a portion of the sides of the top and bottom pieces 32', 34, and the interface between the top and bottom pieces 32', 34'. The bore 36' allows the interstitial space 14 in one two-piece piston 32' to fluidly communicate with the recess 42a in the carrier end plate 40, and the carrier end plate 40 allows each bore 36' in each two-piece piston 30' to fluidly communicate with one another.

Accordingly, as was true for the embodiments previously described herein, the embodiment of the tilting pad bearing 10 shown in FIG. 5 allows for each interstitial space 14 to be in fluid communication with one another. Consequently, this embodiment also allows for load equalizing in the same manner as that described above for the other embodiments of the tilting pad bearing 10.

A third embodiment of the tilting pad bearing 10 is shown in FIGS. 6-12. In the third embodiment, the tilting pad bearing 10 operates under the same principles as those embodiments previously described, but in certain elements of the third embodiment are differently configured than those in the first and second embodiments of the tilting pad bearing 10. The third embodiment of a tilting pad bearing 10 is shown engaged with a collar 6 (which may be fixedly mounted to a shaft 4) in FIGS. 6A and 6B. The collar 6 may rotate with the shaft 4 and engage the bearing pads 20 (and consequently, the tilting pad bearing 10) as best shown in FIG. 6B, which provides a cross-sectional view of the shaft 4, collar 6, and tilting pad bearing 10.

The third embodiment of the tilting pad bearing 10 may utilize both a piston carrier ring 50 and a bearing pad carrier ring 80, both of which are clearly shown in FIGS. 8, 9C, 11A, and 11B. The bearing pad carrier ring 80 may be formed with a main aperture 81 in the center thereof through which a shaft 4 may pass. A circumferential top ridge 85*a* may be formed in the top surface (as viewed from the vantage depicted in FIG. 8) and extend axially therefrom. A plurality of positioner voids 82 may be formed in the top surface of the bearing pad carrier ring 80 between the main aperture 81 and the top ridge 85*a*. Additionally, a first and/or second trough 83*a*, 83*b* may be formed in the bearing pad carrier ring 80. First troughs 83*a* are shown positioned adjacent each positioner void 82 (but which may be positioned adjacent other voids 84, 87, which are described in detail below) to accommodate wires, sensors, or other monitoring and/or control elements that may be incorporated into the tilting pad bearing 10. Second troughs 83*b* are shown positioned in the outer periphery of the bearing pad carrier ring 80 and connecting to a respective positioner shaft 72 (FIG. 9B). However, the presence of troughs 83*a*, 83*b* and material and/or elements positioned therein is in no way limiting to the scope of the tilting pad bearing as disclosed and claimed herein.78.47

A plurality of interface member voids 84 may be formed in the top surface of the bearing pad carrier ring 80 adjacent each positioner void 82. The interface member and positioner voids 84, 82 in the illustrative embodiment are generally cylindrical in shape with the longitudinal axis of each void 82, 84 being parallel to the longitudinal axis of the main aperture 81. In the illustrative example of the third embodiment of a tilting pad bearing 10, eight bearing pads 20 are used, and consequently, eight two piece pistons 30', voids 52 in the piston carrier ring 50, positioners 70, positioner, interface member, and piston voids 82, 84, 87, respectively in the bearing pad carrier ring 80, and interface members 90 are used. However, other embodiments of the tilting pad bearing 10 may use other numbers of bearing pads 20 (and associated elements) without limitation.

An axially extending bottom ridge 85*b* (which may be formed in part due to a recess (not shown) that may be formed in the bottom surface of the bearing pad carrier ring 80) may be formed in the bottom surface of the bearing pad carrier ring 80. The bottom ridge 85*b* may be configured to provide a secure surface for part of the bearing pad carrier ring/piston carrier ring interface 86. Piston voids 87 also may be formed in the bottom surface such that a portion of each two-piece piston 30' may be positioned in each piston void 87, respectively. The piston voids 87 in the illustrative embodiment of the tilting pad bearing 10 are generally cylindrical in shape with the longitudinal axis of each piston void 87 being parallel to the longitudinal axis of the main aperture 81. Any of the voids 52, 82, 84, 87 in the tilting pad bearing 10 may have any shape particularly useful for the specific application without limitation.

Figure 9A:
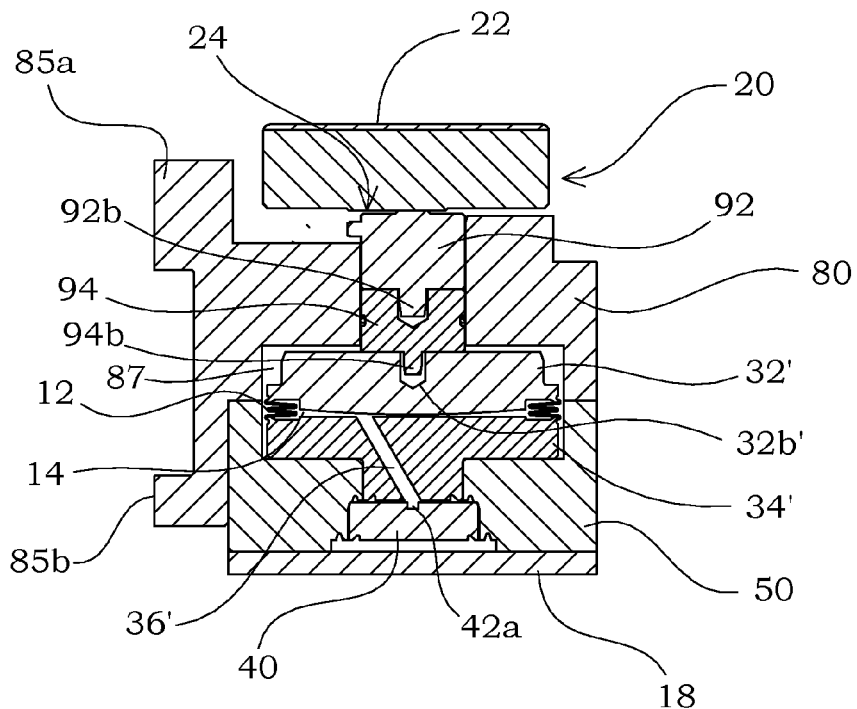
FIG. 9A provides a detailed, axial cross-sectional view of the third embodiment of the tilting pad bearing about a bearing pad and piston.
Figure 9B:
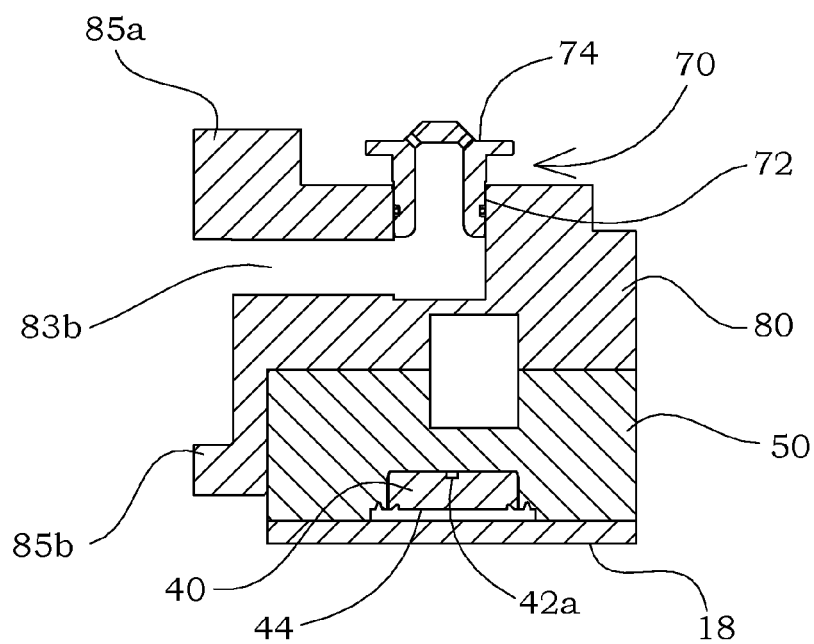
FIG. 9B provides a detailed, axial cross-sectional view of the third embodiment of the tilting pad bearing about an area between two adjacent bearing pads and pistons.
Figure 9C:
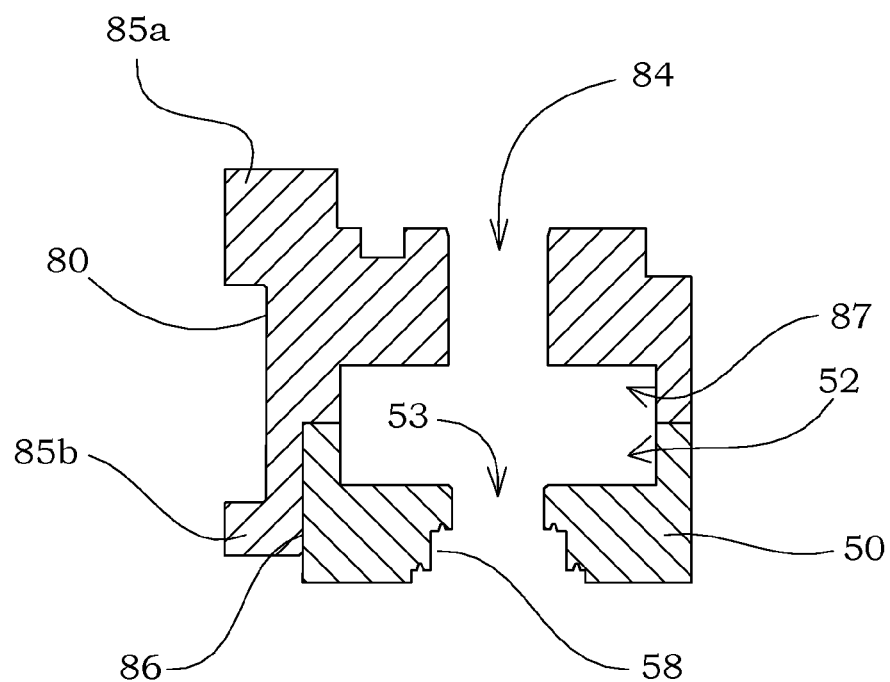
FIG. 9C provides a detailed, axial cross-sectional view of the third embodiment of the tilting pad bearing about a void in the piston carrier ring wherein the piston, interface member, bearing pad, and carrier end plate have been removed for clarity.
Figure 10A:
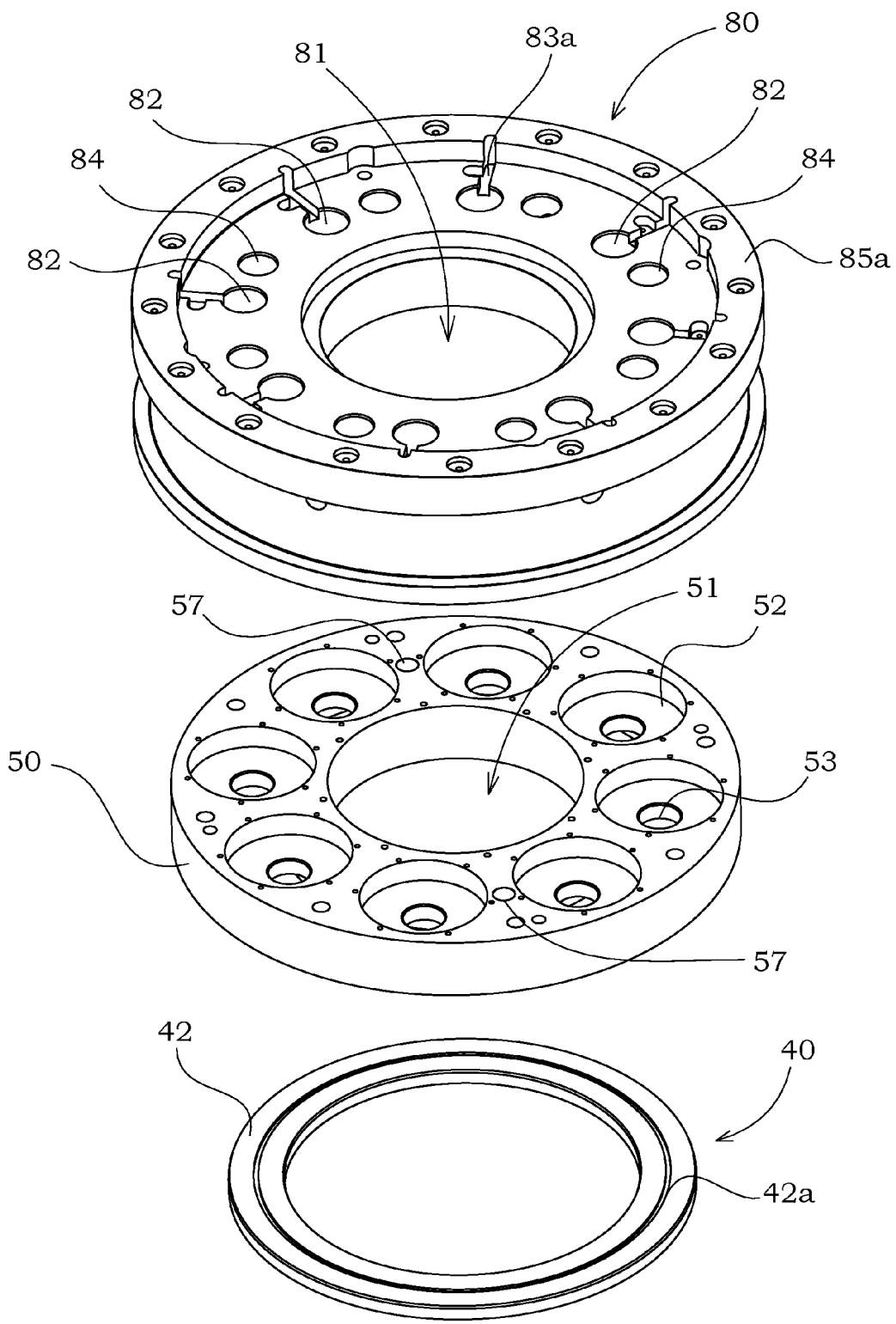
FIG. 10A provides a top, exploded perspective view of a bearing pad carrier ring, piston carrier ring, and carrier end plate that may be used with the tilting pad bearing.
Figure 10B:
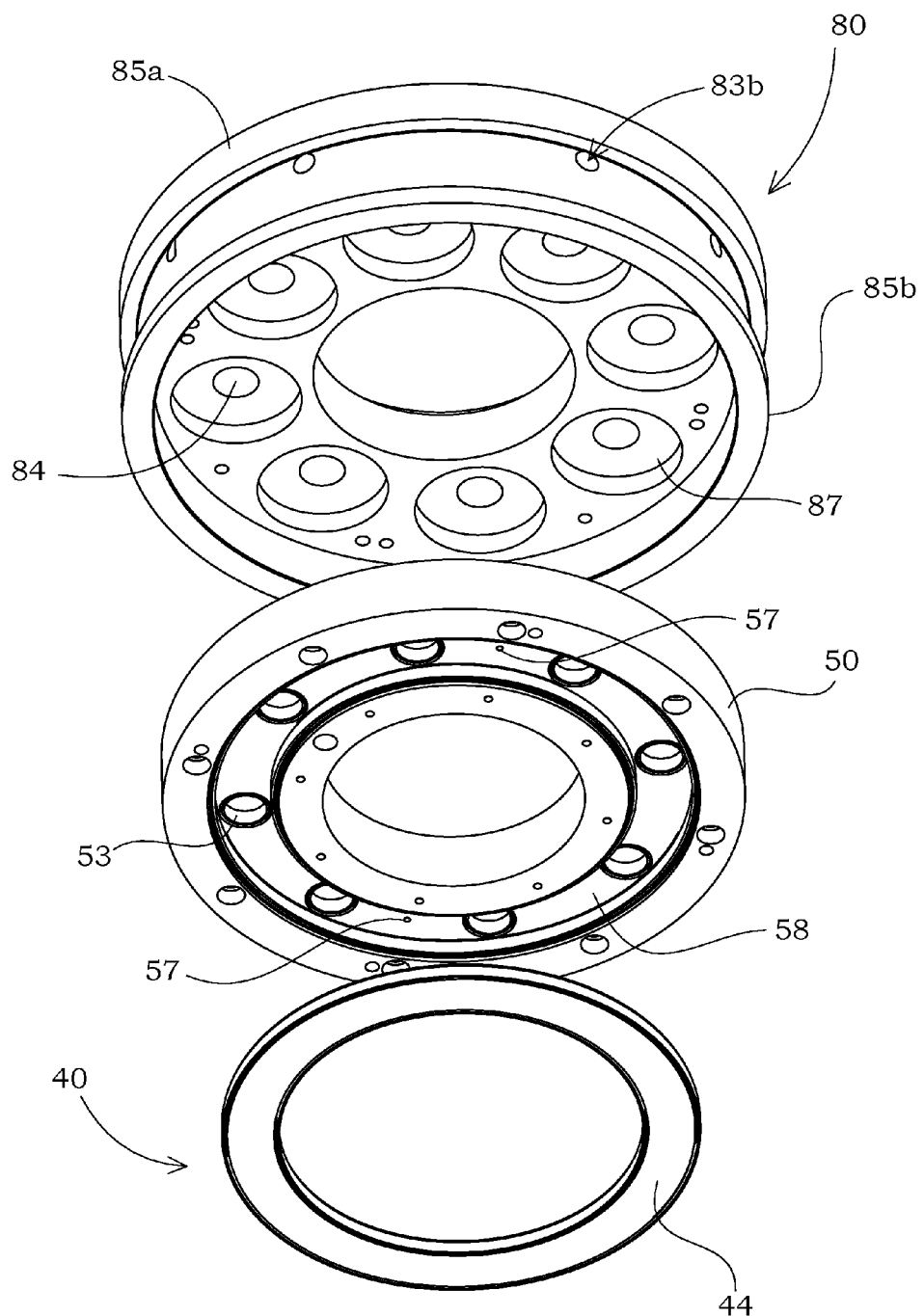
FIG. 10B provides a bottom, exploded perspective view of a bearing pad carrier ring, piston carrier ring, and carrier end plate that may be used with the tilting pad bearing.

A portion of the piston carrier ring 50 may be secured to the bottom side of the bearing pad carrier ring 80 about the bottom ridge 85*b* as shown in FIGS. 9A-9C. The illustrative piston carrier ring 50 shown for the third embodiment of the tilting pad bearing 10 is similar in configuration and function to those for previously described embodiments of the tilting pad bearing 10. Accordingly, the piston carrier ring 50 may be formed with a center aperture 51 around which a plurality of circular voids 52 may be circumferentially distributed. A lip 54 may extend into each void 52, and a lip shelf 54*a* may be formed on the bottom surface of each lip 54. A channel 58 may be formed in the bottom surface of the piston carrier ring 50 into which a carrier end plate 40 may be secured such that the sides of the channel 58 create a piston carrier ring/end plate interface 56 when the carrier end plate 40 is positioned in the channel 58.

As was true for other embodiments of the tilting pad bearing 10 previously disclosed herein, the carrier end plate 40 may be secured in the piston carrier ring 50 channel 58 in the third embodiment such that the piston carrier ring/end plate interface 56 forms a hermetic seal between the top surface 42 and bottom surface 44 of the carrier end plate 40. Accordingly, the fluid-filled interstitial spaces 14 may comprise a closed system hermetically sealed from the exterior environment. The membrane 12 may be secured to the top and bottom shoulder 33', 35' using any suitable method and/or structure, including but not limited to welding, mechanical fasteners such as rivets, screws, or bolts, chemical adhesives, and/or combinations thereof. The carrier end plate 40 may be secured to the piston carrier ring 50 using any suitable method and/or structure, including but not limited to welding, mechanical fasteners such as rivets, screws, or bolts, chemical adhesives, an interference fit, and/or combinations thereof.

Figure 11A:
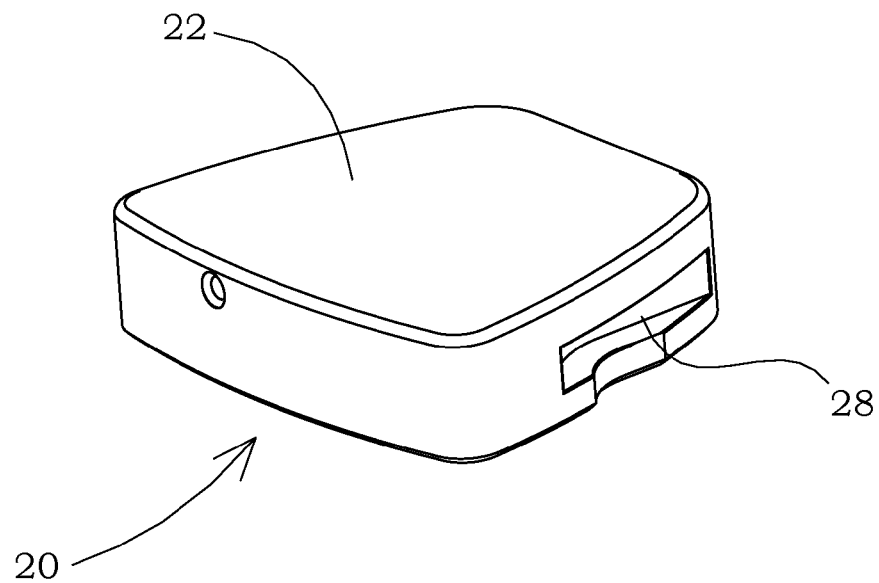
FIG. 11A provides a top perspective view of a bearing pad that may be used with the tilting pad bearing.
Figure 11B:
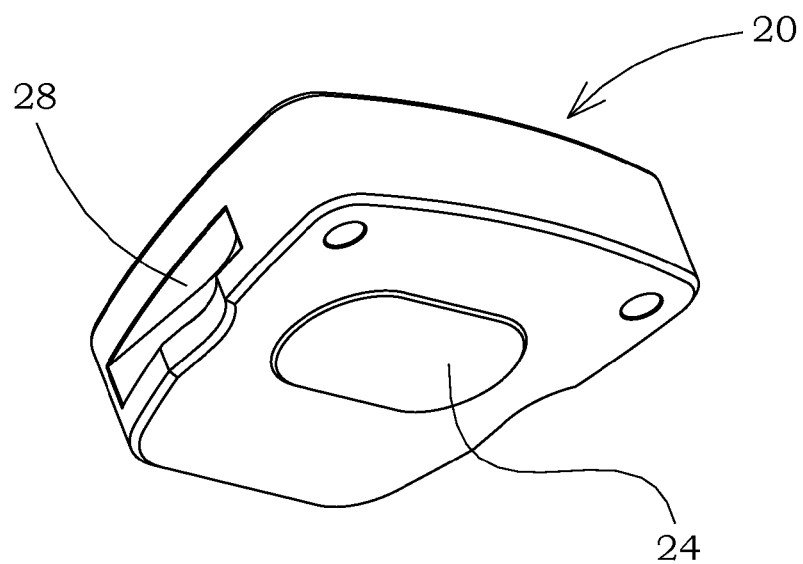
FIG. 11B provides a bottom perspective view of a bearing pad that may be used with the tilting pad bearing.

In the third embodiment, the degree of movement of the bearing pads 20 in a radial plane may be restricted through the top ridge 85*a* of the bearing pad carrier ring 80 and the positioners 70. Each positioner 70 may be formed with a positioner shaft 72 that fits into a positioner void 82 and a positioner head 74 that may engage two adjacent bearing pads 20. Each bearing pad 20 in the third embodiment may be formed with a positioner groove 28 on either side thereof (as best shown in FIGS. 11A and 11B), into which the positioner head 74 of a positioner 70 may fit. In the illustrative example, each positioner 70 engages two adjacent bearing pads 20, but this arrangement will vary in other embodiments. The top ridge 85*a* of the bearing pad carrier ring 80 may serve as a limit for the radial outward motion of any bearing pad 20 be engaging the radially outward surface of any bearing pad 20. Accordingly, certain embodiments of the tilting pad bearing 10 may function without a retaining plate 60.

An interface member 90 may be used to communicate axial forces from a bearing pad 20 to a two-piece piston 30', as best shown in FIG. 9A. The interface member 90 may be comprised of a top piece 92 and a bottom piece 94, as shown for the third embodiment of the tilting pad bearing 10, or it may be comprised of a single, unitary structure. In the embodiment pictured herein, the top piece 92 engages the internal bearing surface 24 of the bearing pad 20 at the top surface 92*a* of the top piece 92. A nipple 92*b* may be formed at the bottom surface of the top piece 92. This nipple 92*b* may engage a recess 94a formed in the bottom piece 94 to secure the relative positions of the top and bottom pieces 92, 94 of any given interface member 90. A tab 94b may be formed in the bottom surface of the bottom piece 94a.

Figure 12A:
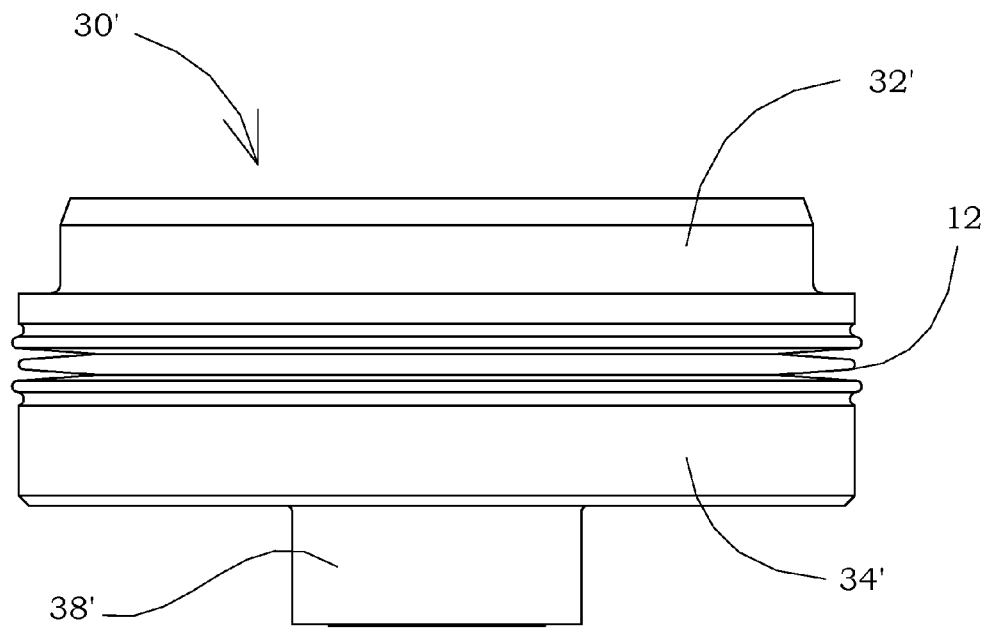
FIG. 12A provides a side view of one embodiment of a two-piece piston that may be used with the tilting pad bearing.
Figure 12B:
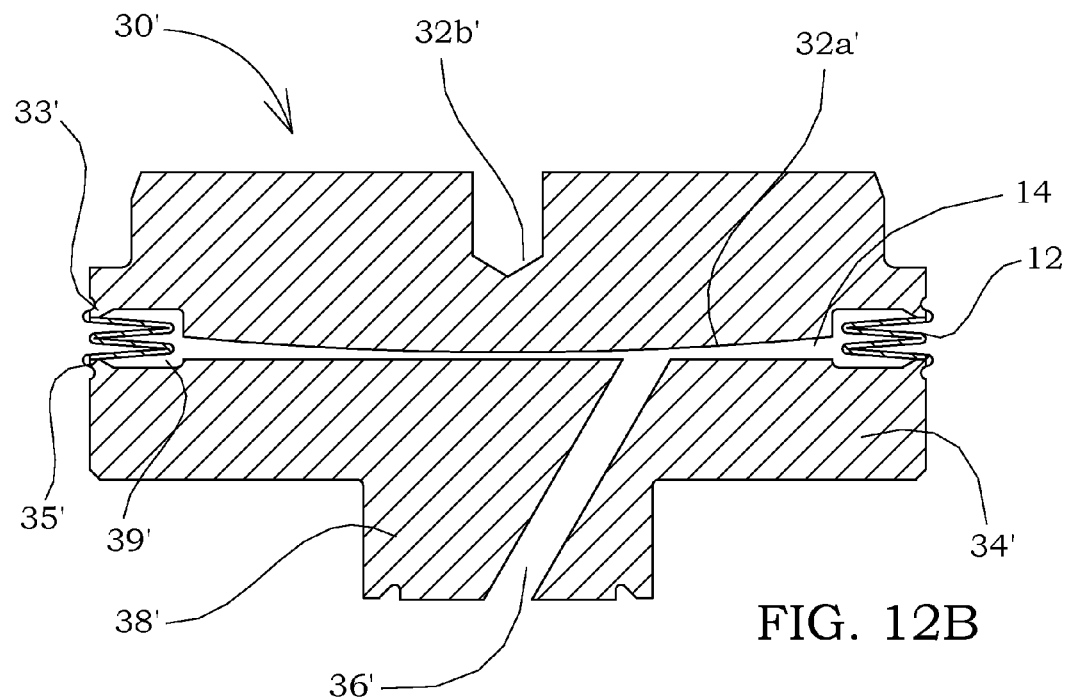
FIG. 12B provides a cross-sectional view of the embodiment of a two-piece piston shown in FIG. 12A.

The two-piece piston 30' shown in the third embodiment of the tilting pad bearing 10 is similar in function to that of the tilting pad bearing 10 shown in FIG. 5. The two-piece piston 30' for the third embodiment may include a top piece 32' and a bottom piece 34' (as best shown in FIGS. 12A and 12B), wherein the top piece 32' may be primarily located in a piston void 87 of the bearing pad carrier ring 80 when the tilting pad bearing 10 is assembled (FIG. 9A). Conversely, the bottom piece 34; may be primarily located in a void 52 of the piston carrier ring 50 when the tilting pad bearing 10 is assembled.

The top piece 32' may be formed with a radiused surface 32a' facing the bottom piece 34' and a divot 32b' opposite the bottom piece 34'. The divot 32b' may engage the tab 94b of the interface member 90 to secure the relative positions of an interface member 90 and corresponding two-piece piston 30'. The top and bottom pieces 32', 34' of the two-piece piston 30' may be engaged to one another via a membrane 12 attached to both pieces 32', 34 as previously described for the embodiment of the tilting pad bearing 10 shown in FIG. 5 at the top shoulder 33' and bottom shoulder 35', respectively. In the two-piece piston 30' shown for the third embodiment, the membrane 12 may be formed through welding of multiple layers. Alternatively, the membrane 12 may be hydraulically formed from a single piece of material. Accordingly, the scope of the tilting pad bearing 10 is in no way limited by the method and/or structure used to form the membrane 12 used therewith. The top and bottom pieces 32', 34, in cooperation with the membrane 12 may form an interstitial space 14 there between, into which a fluid may be sealed.

A spigot 38' may be formed at the bottom of the bottom piece 34' to fit within a hole 53 in the piston carrier ring 50, which hole 53 may be concentric with respect to a void 52, or which may be otherwise oriented/configured as described above for the embodiment of the tilting pad bearing 10 shown in FIG. 5. The bottom piece 34' may be secured to the piston carrier ring 50 in any manner as previously described for the embodiment shown in FIG. 5. Additionally, the bottom piece 34' may be formed with a bore 36' therein extending from the top surface of the bottom piece 34' through a spigot 38'. The bore 36' allows the interstitial space 14 to be in fluid communication with the recess 42a in the carrier end plate 40 such that all the interstitial spaces 14 in the tilting pad bearing 10 are in fluid communication with one another. A groove 39' may be formed in the top surface of the bottom piece 34' for retention of fluid within the interstitial space 14.

From the preceding descriptions and figures herein, it will be apparent that the third embodiment of the tilting pad bearing 10 shown in FIGS. 6-12 allows for each interstitial space 14 to be in fluid communication with one another. Consequently, the third embodiment also allows for load equalizing in the same manner as that described above for the other embodiments of the tilting pad bearing 10. It is contemplated that the two-piece pistons 30' may be secured to the piston carrier ring 50 by welding the periphery of each bottom spigot 38' to the periphery of the lip 54, as with the embodiment shown in FIG. 5. Additionally, the carrier end plate 40 may be secured to the piston carrier ring 50 by welding the inner and outer diameters thereof to the inner and outer diameters of the channel 58, as best shown in FIG. 10B. At this point, fluid may be introduced into the interior of the tilting pad bearing 10 through at least one fill aperture 57 formed in the piston carrier ring 50. Each fill aperture 57 may subsequently be sealed with a plug 57a (best shown in FIG. 8) so that the fluid-filled portion of the tilting pad bearing 10 is hermetically sealed from the environment.

The optimal dimensions and/or configuration of the membrane 12, interstitial space 14, bearing pad 20, piston 30, two-piece piston 30', carrier end plate 40, piston carrier ring 50, retaining plate 60, positioner 70, bearing pad carrier ring 80, and interface member 90 will vary from one embodiment of the tilting pad bearing 10 to the next, and are therefore in no way limiting to the scope thereof. The various elements of the tilting pad bearing 10 may be formed of any material that is suitable for the application for which the tilting pad bearing 10 is used. Such materials include but are not limited to metals and their metal alloys, polymeric materials, and/or combinations thereof.

Although the specific embodiments pictured and described herein pertain to a tilting pad bearing 10 having eight or ten bearing pads 20, pistons 30, membranes 12, and voids 52 evenly spaced about the circumference of the piston carrier ring 50, retaining plate 60, positioner 70, bearing pad carrier ring 80, and/or interface member 90, the tilting pad bearing 10 may be configured with other orientations and/or with different quantities of the various elements having different shapes and/or orientations. Accordingly, the scope of the tilting pad bearing 10 is in no way limited by the specific shape and/or dimensions of the membrane 12, interstitial space 14, bearing pad 20, piston 30, two-piece piston 30', carrier end plate 40, piston carrier ring 50, retaining plate 60, positioner 70, bearing pad carrier ring 80, and/or interface member 90 or the relative quantities and/or positions thereof.

Having described the preferred embodiments, other features, advantages, and/or efficiencies of the tilting pad bearing 10 will undoubtedly occur to those versed in the art, as will numerous modifications and alterations of the disclosed embodiments and methods, all of which may be achieved without departing from the spirit and scope of the tilting pad bearing 10 as disclosed and claimed herein. It should be noted that the tilting pad bearing 10 is not limited to the specific embodiments pictured and described herein, but are intended to apply to all similar apparatuses for evenly transmitting an axial load across a plurality of bearing pads 20, pistons 30, piston carrier ring 50, and/or bearing pad carrier ring 80. Modifications and alterations from the described embodiments will occur to those skilled in the art without departure from the spirit and scope of tilting pad bearing 10.

The invention claimed is:

1. A tilting pad bearing comprising:
   a. a piston carrier ring with a plurality of voids distributed circumferentially around said piston carrier ring, wherein a channel is formed in a surface of said piston carrier ring opposite said plurality of voids;
   b. a carrier end plate positioned in said channel and cooperating with said piston carrier ring, wherein a recess is formed in a top surface of said carrier end plate;
   c. a plurality of pistons distributed circumferentially around said piston carrier ring, wherein one of each said pistons is positioned in one of each said voids, and wherein a bottom face of each said piston is positioned toward said recess;
   d. a plurality of membranes distributed circumferentially around said piston carrier ring, wherein one of each said membranes is positioned adjacent to a corresponding said piston and void, and wherein each said membrane is configured to flexibility secure said corresponding piston in said corresponding void;

e. a plurality of bearing pads distributed circumferentially around said piston carrier ring, wherein one of each said bearing pads is positioned adjacent a top face of a corresponding piston.

2. The tilting pad bearing according to claim 1 wherein said tilting pad bearing further comprises a fluid, wherein said fluid is positioned between said plurality of membranes and said carrier end plate top surface.

3. The tilting pad bearing according to claim 1 wherein an interface between said piston and a corresponding bearing pad is further defined as a non-pivoting interface.

4. The tilting pad bearing according to claim 1 wherein said carrier end plate and said piston carrier ring are configured such that the relative positions thereof are substantially fixed.

5. The tilting pad bearing according to claim 1 wherein said plurality pistons and said plurality of membranes cooperate with said piston carrier ring to form a plurality of interstitial spaces.

6. The tilting pad bearing according to claim 5 wherein said plurality of interstitial spaces is further defined as being hermetically sealed from an external environment.

7. The tilting pad bearing according to claim 6 wherein said piston carrier ring further comprises a fill aperture and a corresponding plug, wherein said fill aperture is in fluid communication with at least one said interstitial space and said recess in said carrier end plate.

8. A tilting pad bearing comprising:
 a. a piston carrier ring, said piston carrier ring comprising:
  i. a void formed in said piston carrier ring, wherein said void includes an annular lip extending radially inward from said piston carrier ring;
  ii. a channel formed in a surface of said piston carrier ring opposite said void;
 b. a carrier end plate positioned in said channel and secured to said piston carrier ring, wherein a recess is formed in a top surface of said carrier end plate such that said recess is adjacent said void;
 c. a piston positioned in said void, said piston comprising:
  i. a top face opposite said carrier end plate;
  ii. a bottom face adjacent said carrier end plate;
  iii. a piston shoulder intermediate said top and bottom faces;
  iv. a relief formed adjacent said piston shoulder and extend to said bottom face;
 d. a membrane cooperating with said lip and said piston shoulder, wherein said membrane allows a predetermined amount of axial and rotational relative motion between said piston and said piston carrier ring;
 e. a bearing pad cooperating with said top face of said piston; and
 f. a retaining plate cooperating with said piston carrier ring.

9. The tilting pad bearing according to claim 8 wherein said tilting pad bearing further comprises:
 a. a second void formed in said piston carrier ring;
 b. a second piston positioned in said second void, said second piston comprising:
  i. a top face opposite said carrier end plate;
  ii. a bottom face adjacent said carrier end plate;
  iii. a piston shoulder intermediate said top and bottom faces;
  iv. a relief formed adjacent said piston shoulder and extend to said bottom face;
 c. a second membrane cooperating with said lip and said second piston shoulder, wherein said second membrane allows a predetermined amount of axial and radial relative motion between said second piston and said piston carrier ring, and wherein an interstitial space between said piston bottom face and said carrier end plate top surface is in fluid communication with a second interstitial space between said second piston bottom face and said carrier end plate top surface via said recess in said carrier end plate.

10. The tilting pad bearing according to claim 9 wherein an interface between said top face of said piston and said bearing pad is further defined as a non-pivoting interface.

11. The tilting pad bearing according to claim 9 wherein said carrier end plate and said piston carrier ring are configured such that the relative positions thereof are substantially fixed.

12. The tilting pad bearing according to claim 9 wherein said piston and said membrane cooperate with said piston carrier ring to form an interstitial space.

13. The tilting pad bearing according to claim 12 wherein said interstitial space is further defined as being hermetically sealed from an external environment.

14. The tilting pad bearing according to claim 13 wherein said piston carrier ring further comprises a fill aperture and a corresponding plug, wherein said fill aperture is in fluid communication with said interstitial space and said recess in said carrier end plate.

* * * * *